US012571460B2

(12) United States Patent
Kaltenbach et al.

(10) Patent No.: US 12,571,460 B2
(45) Date of Patent: Mar. 10, 2026

(54) GEARBOX AND DRIVE UNIT WITH A GEARBOX FOR A VEHICLE

(71) Applicant: ZF Friedrichshafen AG, Friedrichshafen (DE)

(72) Inventors: Johannes Kaltenbach, Friedrichshafen (DE); Thomas Martin, Weissenberg (DE); Fabian Kutter, Kressbronn (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/968,122

(22) Filed: Dec. 4, 2024

(65) Prior Publication Data

US 2025/0180101 A1     Jun. 5, 2025

(30) Foreign Application Priority Data

Dec. 4, 2023     (DE) ..................... 10 2023 212 132.8

(51) Int. Cl.
*F16H 37/08* (2006.01)

(52) U.S. Cl.
CPC ... *F16H 37/082* (2013.01); *F16H 2200/0021* (2013.01); *F16H 2200/2007* (2013.01);
(Continued)

(58) Field of Classification Search
CPC ........... F16H 37/082; F16H 2200/0021; F16H 2200/2007; F16H 2200/201; F16H 2200/2038; F16H 2200/2094
See application file for complete search history.

(56) References Cited

U.S. PATENT DOCUMENTS

| | | | |
|---|---|---|---|
| 4,569,252 A | 2/1986 | Harper |
| 5,168,946 A | 12/1992 | Dorgan |
| | (Continued) | | |

FOREIGN PATENT DOCUMENTS

| | | |
|---|---|---|
| DE | 10 2008 063 533 A1 | 7/2010 |
| DE | 10 2009 002 437 A1 | 10/2010 |
| | (Continued) | |

OTHER PUBLICATIONS

DE-102022204741-A1 (2023).*
(Continued)

*Primary Examiner* — Derek D Knight
(74) *Attorney, Agent, or Firm* — Finch & Maloney PLLC

(57) ABSTRACT

A vehicle transmission has a first, second, and third shifting elements. First and second planetary gearsets each have a sun shaft, a ring gear shaft, and a web shaft. The first sun shaft is connected rotationally fixed to the second sun shaft and form the drive input. The first web shaft is connected rotationally fixed to the second ring gear shaft, which is configured as the drive output. The shift elements are combined to form a shifting unit with five shift positions and having a single axially displaceable sliding sleeve. In the closed condition of the first shifting element, the first web shaft and the second ring gear shaft are connected to a stationary component. In the closed condition of the second shifting element, the first ring gear shaft is connected to a stationary component. In the closed condition of the third shifting element, the planetary gearsets are blocked.

10 Claims, 8 Drawing Sheets

(52) U.S. Cl.
   CPC ............... *F16H 2200/2038* (2013.01); *F16H 2200/2094* (2013.01)

(56)                    References Cited

U.S. PATENT DOCUMENTS

|  |  |  |  |  |  |
|---|---|---|---|---|---|
| 6,139,464 | A | 10/2000 | Roske | | |
| 6,305,518 | B1 | 10/2001 | Buri | | |
| 6,514,170 | B1 | 2/2003 | Kao et al. | | |
| 8,210,981 | B2 | 7/2012 | Bauknecht et al. | | |
| 8,231,501 | B2 | 7/2012 | Gumpoltsberger et al. | | |
| 8,517,882 | B2 | 8/2013 | Wenthen | | |
| 8,640,801 | B2 | 2/2014 | Hennings et al. | | |
| 9,242,555 | B2 | 1/2016 | Wenthen | | |
| 9,447,848 | B2 | 9/2016 | Beck et al. | | |
| 10,145,453 | B2 | 12/2018 | Lippert et al. | | |
| 11,124,064 | B2 * | 9/2021 | Kaltenbach | ............... | F16H 3/66 |
| 11,353,091 | B2 * | 6/2022 | Renner | ................... | F16H 3/663 |
| 11,754,158 | B2 * | 9/2023 | Reisch | .................... | F16H 3/663 475/150 |
| 2005/0148421 | A1 | 7/2005 | Keuth | | |
| 2012/0115672 | A1 | 5/2012 | Gumpoltsberger et al. | | |
| 2015/0152960 | A1 | 6/2015 | Haug et al. | | |
| 2017/0059023 | A1 * | 3/2017 | Severinsson | ......... | B60K 17/165 |
| 2017/0204942 | A1 | 7/2017 | Tuchi et al. | | |
| 2020/0132170 | A1 | 4/2020 | Rippelmeyer | | |
| 2020/0282827 | A1 | 9/2020 | Kaltenbach et al. | | |

FOREIGN PATENT DOCUMENTS

|  |  |  |  |  |  |
|---|---|---|---|---|---|
| DE | 10 2013 226 471 A1 | 6/2015 | | | |
| DE | 10 2013 226 474 A1 | 6/2015 | | | |
| DE | 10 2016 206 026 A1 | 10/2017 | | | |
| DE | 10 2017 111 051 B3 | 6/2018 | | | |
| DE | 10 2017 011 387 A1 | 6/2019 | | | |
| DE | 10 2018 000 187 A1 | 8/2019 | | | |
| DE | 102019218413 A1 | 6/2021 | | | |
| DE | 102022201321 A1 | 8/2023 | | | |
| DE | 102022204741 A1 * | 11/2023 | .............. | B60K 6/36 | |
| JP | 20120020111 B2 | 8/2013 | | | |
| WO | 2012/082380 A1 | 6/2012 | | | |

OTHER PUBLICATIONS

German Patent Office, Office Action issued in German patent application No. 10 2023 212 132.8 (Jul. 17, 2024).
BusToCoach on-line Magazine, "ZF for Electric Buses" (May 2017) available at https://bustocoach.corn/maggio_2017hts_en (German Search Report Corresponding to 10 2019 202 994.9 dated Dec. 2, 2019).

* cited by examiner

GEARBOX AND DRIVE UNIT WITH A GEARBOX FOR A VEHICLE

RELATED APPLICATIONS

This application claims the benefit of and right of priority under 35 U.S.C. § 119 to German Patent Application no. 10 2023 212 132.8, filed on 4 Dec. 2023, the contents of which are incorporated herein by reference in its entirety.

FIELD OF THE DISCLOSURE

The invention relates to a transmission for a vehicle. In addition, the invention relates to a drive unit for a vehicle, wherein the drive unit comprises an electric machine and a transmission of the type with several gears. The invention also relates to a vehicle with such a drive unit.

BACKGROUND

For example, DE 10 2019 202 994 A1 discloses a drive unit for an electric vehicle, which comprises an electric machine and a three-gear transmission with a first shifting element, a second shifting element, a third shifting element and two planetary gearsets coupled to one another, wherein the first planetary gearset comprises a first sun shaft, a first ring gear shaft, and a first web shaft and the second planetary gearset comprises a second sun shaft, a second ring gear shaft, and a second web shaft, wherein the first web shaft is connected fixed to the second ring gear shaft, wherein the first sun shaft can be driven by the electric machine, wherein the first ring gear shaft is immobilized, wherein the drive output takes place via the second web shaft, and wherein, to engage the first gear the first shifting element, to engage the second gear the second shifting element, and to engage the third gear the third shifting element can be actuated.

SUMMARY

The purpose of the present invention is to provide an alternative transmission for a vehicle. In particular, the transmission should have a compact structure. The objective is achieved by a transmission having the features disclosed herein. Advantageous embodiments will be apparent in light of the description given below and the figures.

A transmission according to the invention for a vehicle comprises a first shifting element, a second shifting element, a third shifting element, a first planetary gearset with a first sun shaft, a first ring gear shaft and a first web shaft, and a second planetary gearset with a second sun shaft, a second ring gear shaft and a second web shaft, wherein the first sun shaft and the second sun shaft are connected in a rotationally fixed manner and are designed as the drive input, wherein the first web shaft and the second ring gear shaft are connected rotationally fixed to one another, wherein the second web shaft is designed to be the drive output, wherein the first shifting element, the second shifting element and the third shifting element are combined in a shifting unit with five shift positions, wherein the shifting unit comprises a single axially displaceable sliding sleeve, wherein in the closed condition of the first shifting element a first gear with a first gear ratio is engaged, wherein in the first gear the first web shaft and the second ring gear shaft are connected rotationally fixed to a stationary component, wherein in the closed condition of the second shifting element a second gear with a second gear ratio is engaged, wherein in the second gear the first ring gear shaft is connected rotationally fixed to a stationary component, wherein in the closed condition of the third shifting element a third gear in the form of a straight-through gear with a third gear ratio is engaged, and wherein in the third gear the planetary gearsets are blocked.

In other words, the first and second planetary gearsets form a shiftable Simpson gearset which is particularly compact. By virtue of the blocking of the first and second planetary gearsets by means of the third shifting element, the gear ratio is independent of the number of teeth of the elements meshing with one another, i=1. To put it differently, the Simpson gearset rotates as a block. The transmission according to the invention is not only compact, but also has good gear efficiency and is exceptionally robust at high rotation speeds. Thus, by connecting a high-speed electric machine with rotation speeds of 18,000 rpm, for example, to the input shaft, low ring gear and planetary gearwheel rotation speeds are made possible. Low ring gear rotation speeds reduce drag torques and wobbling. Low planetary gearwheel rotation speeds reduce bearing losses and have a positive effect on the acoustics.

In particular the first sun shaft and the second sun shaft form a first coupling shaft between the two planetary gearsets, whereas the first web shaft and the second ring gear shaft form a second coupling shaft between the two planetary gearsets. In the context of the invention a "shaft" is understood to be a rotatable component by way of which respective associated components of the transmission are connected rotationally fixed to one another or by way of which such a connection can be produced by actuating one of the shifting elements. The shaft concerned can connect the components axially or radially or even both axially and radially. Thus, the shaft concerned can also be present as an intermediate component by means of which a particular component can for example be connected radially. The term "shaft" does not exclude that the components to be connected can be made integrally, in one piece. In particular, two or more shafts connected rotationally fixed to one another can be made integrally.

A drive unit according to the invention for a vehicle comprises an electric machine and a transmission according to the invention. The transmission enables the connection of the electric machine so as to introduce a drive power via a drive input shaft. The transmission is drivingly connected via a drive output shaft either to a differential or to a vehicle wheel. The driving of the transmission always takes place by way of a drive input shaft whereas the drive output of the transmission always takes place by way of a drive output shaft. The drive input shaft is drivingly connected to the electric machine. The drive output shaft is drivingly connected at least indirectly to at least one vehicle wheel. For example, a single drive unit is used in an electric drive axle for an electric vehicle, and in that case the drive output shaft is drivingly connected to a differential. Alternatively, two drive units can be used in an electric drive axle for an electric vehicle, and in that case the respective drive output shafts are drivingly connected to the respective vehicle wheels of the drive axle. The transmission has exactly three gears which are engaged by means of the shifting elements, whereby an electric vehicle with high energy efficiency is produced.

For example, the first and second sun shafts, i.e., the first coupling shaft, are connected rotationally fixed to the drive input shaft of the transmission, whereas the second web shaft is connected rotationally fixed to the drive output shaft of the transmission.

The shifting elements are in the form of gear shifting elements and are thus designed to engage gears. To engage the first gear only the first shifting element can be actuated or closed. To engage the second gear only the second shifting element can be actuated or closed. To engage the third gear only the third shifting element can be actuated or closed. A "shifting element" is understood to be a shiftable device which in a closed condition connects two shafts or a shaft and a stationary component rotationally fixed to one another, and in an open condition decouples the two shafts or the shaft and the stationary component from one another. The two shafts can then rotate relative to one another. In its closed condition the first shifting element connects the first web shaft to the second ring gear shaft, i.e. the second coupling shaft, to a stationary component in order to engage the first gear. A "stationary component" is understood to mean a component that is immobilized, in particular connected rotationally fixed to or made integrally with a housing or part of a housing. In its closed condition the second shifting element connects the first ring gear to a stationary component in order to engage the second gear. In its closed condition the third shifting element connects two of the three elements sun shaft, web shaft and ring gear shaft of one of the planetary gearsets to one another, or an element of the first planetary gearset to an element of the second planetary gearset in order to block the planetary gearsets and engage the third gear. The third gear is in the form of a straight-through gear and by virtue of the block rotation of the two planetary gearsets has good efficiency and no gear losses.

For example, according to a first blocking variant, in its closed condition the third shifting element connects the first ring gear shaft to the second ring gear shaft, whereby the second ring gear shaft is connected rotationally fixed to the first web shaft. For example, in a second blocking variant, in its closed condition the third shifting element connects the first ring gear shaft and the first sun shaft whereby the first sun shaft is connected rotationally fixed to the second sun shaft. In both blocking variants the third gear is engaged.

Preferably, the first planetary gearset comprises at least three and at most five planetary gearwheels, which specifically mesh, i.e., are in tooth engagement, with both the first sun gear and also with the first ring gear. Furthermore, preferably the second planetary gearset comprises at least three and at most six planetary gearwheels, which specifically mesh, i.e. are in tooth engagement, with the first sun gear and also with the first ring gear. In particular, a respective planetary gearwheel is held on at least one bearing element which is arranged radially between the planetary gearwheel concerned and the bolt on the planetary carrier. The bearing element can for example be a needle bearing on which the planetary gearwheel concerned is held. For example, the bearing element extends all the way through the planetary gearwheel concerned.

In a preferred embodiment, all the shifting elements are in the form of interlock-type shifting elements. For example, an interlocking shifting element is in the form of a claw-type shifting element. Owing to reduced drag losses, the efficiency of the transmission can be increased thereby. In particular interlocking shifting elements are more compact and are efficiency-optimized and are less expensive than frictional shifting elements.

According to the invention, the first shifting element, the second shifting element and, the third shifting element form a shifting unit with five shift positions, wherein the shifting unit comprises a single axially displaceable sliding sleeve. The sliding sleeve can be displaced axially in the shifting device concerned by means of a single actuator. Preferably, between two gear positions the shifting device has a neutral position, so that five shift positions in all, namely three gear positions and two neutral positions, are provided. In a neutral position the two shafts or a shaft and a stationary component are decoupled from one another by the shifting device, so that then the sliding sleeve is rotationally engaged with only one shaft.

In particular the actuator pushes the sliding sleeve to the required position and thereby engages up to three gears sequentially. Preferably, the sliding sleeve has interlocking claws which, in the respective gear positions, co-operate with respective corresponding claw teeth in order to create a rotationally fixed connection between two shafts or a shaft and a stationary component. Thus, the claw teeth that co-operate by interlocking with those of the sliding sleeve are understood to constitute a shifting element. In particular, in a respective neutral position the sliding sleeve is located axially between two gear positions, so that a change between the gears always involves passing through a neutral position. Preferably, the shifting unit comprises an unsynchronized claw clutch.

According to an embodiment, the transmission also comprises a differential with a differential input shaft and two differential output shafts. For example, the differential is in the form of a bevel gear differential. A differential in the form of a bevel gear differential has two drive output elements on the wheel side, specifically a first drive output gearwheel and a second drive output gearwheel. The two drive output gearwheels each mesh with an equalizing element. The equalizing elements are mounted in a differential cage and can rotate about their own axes. Each drive output wheel is connected rotationally fixed to a corresponding differential output shaft. The drive input of the differential takes place by way of the differential cage which is designed to be the differential input shaft. The drive power fed into the differential gear system is distributed to the differential output shafts and transmitted to the drive wheels of the axle. The differential output shafts are designed to be drivingly connected to the drive wheels of the vehicle. Each differential output shaft can be connected directly or immediately, or else indirectly via a joint, a joint shaft and/or a wheel hub to the associated vehicle wheel.

In an embodiment, the differential is in the form of an integral differential with a first planetary gearset and a second planetary gearset. In particular the two planetary gearsets of the integral differential are radially nested, with the shifting elements arranged axially between the radially nested planetary gearsets of the transmission and the integral differential. This increases the compactness of the transmission. An "integral differential" is understood to mean a differential with a first planetary gearset and a second planetary gearset functionally connected to the first planetary gearset. The first planetary gearset of the integral differential is drivingly connected on one side to the drive output shaft of the transmission, on the other side to the second planetary gearset of the integral differential, and is at least indirectly functionally connected to the first differential output shaft. The second planetary gearset of the integral differential is also functionally connected to the second differential output shaft and is supported on a stationary component, in particular a housing component. By means of such an integral differential the input torque introduced into the integral differential can be transformed and divided in a defined ratio between the two differential output shafts. In particular, the input torque can be transmitted equally to the two differential output shafts.

5

At identical drive output rotation speeds of the output shafts, the integral differential has no teeth that rotate in a block or without any roller movement. Consequently, regardless of the drive output rotation speeds of the output shafts, there is always a relative movement of the components of the integral differential that mesh with one another. With an integral differential the sums of the two wheel torques are not combined or conjoined in a common axle torque in a component, but rather a drive power is divided in the integral differential and passed on in accordance with the design of the first and second planetary gearsets into the differential output shafts functionally connected with them. Accordingly, due to the comparatively small torques the components of the integral differential can be made slimmer. Furthermore, there are fewer components and weight is saved. By means of an integral differential of that type the two functions of torque transformation and torque distribution, which as a rule are achieved by two separate assemblies, are performed by a single integral assembly. Thus, the integral differential is a combined gear ratio and differential gear system which on the one hand realizes a torque transformation and on the other hand distributes the torque to the differential output shafts.

According to an embodiment, the transmission also comprises a transmission gear system with a third sun shaft, a third ring gear shaft, and a third web shaft, wherein the third sun shaft is connected rotationally fixed to the second web shaft, wherein the third ring gear shaft is connected rotationally fixed to a stationary component, and wherein the third web shaft is designed as the drive output. In other words, the transmission gear is in the form of a downstream planetary gearset and is arranged in the power flow between the Simpson gearset and the differential gear system in order to produce a higher overall gear ratio. In particular the transmission gear is designed as a third planetary gearset and is arranged coaxially with the first and second planetary gearsets. Preferably the transmission gear is axially adjacent to the second planetary gearset. Preferably, the web shaft of the third planetary gearset has at least three and at most five planetary gearwheels, each of them meshing, i.e., in tooth engagement, with both the third sun shaft and the third ring gear shaft.

In an embodiment, the shifting unit is radially nested with at least one or with both planetary gearsets. In that way the transmission is made axially more compact. Preferably, the two planetary gearsets are arranged radially at least partially or completely inside the shifting unit. For that purpose, the planetary gearsets project axially at least partially or completely into the shifting unit and at least partially or completely overlap axially with the shifting unit. When three planetary gearsets are provided, then according to an embodiment the shifting unit can be radially nested with all three planetary gearsets.

According to an embodiment, the shifting unit is designed to be arranged axially between an electric machine and the first planetary gearset. Consequently, the shifting unit is arranged in the transmission on the input side. In that way the transmission does not need any pot over the second planetary gearset for connecting the first planetary gearset.

A vehicle according to the invention comprises at least one drive unit according to the invention. Accordingly, the above definitions and explanations regarding technical effects, advantages and advantageous embodiments of the drive unit according to the invention also apply to the vehicle according to the invention.

6

BRIEF DESCRIPTION OF THE DRAWINGS

Advantageous embodiments of the invention, which are explained below, are illustrated in the drawings, in which the same or similar elements are denoted by the same indexes and which show.

DETAILED DESCRIPTION

Figure 1:
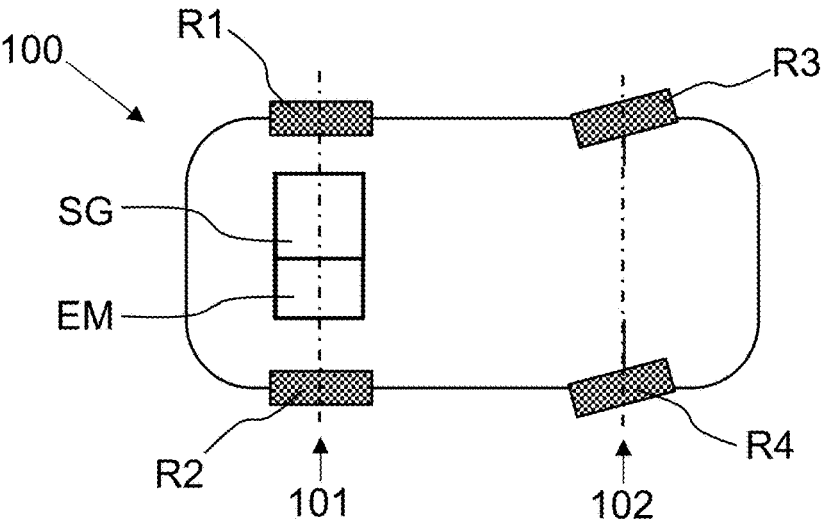
FIG. 1: A very abstract and schematic view of a vehicle with a drive axle that comprises an electric machine and a transmission according to the invention.

FIG. 1 shows a vehicle 100 with a first axle 101 with two vehicle wheels R1, R2 and a second axle 102 with vehicle wheels R3, R4. In this case the first axle 101 is in the form of the rear axle of the vehicle 100 and is equipped with a drive unit according to the invention. The drive unit comprises an electric machine EM which is designed to generate a drive power, and a transmission SG with a plurality of gears. Thus, the vehicle 100 is designed as an electric vehicle, i.e. as a vehicle powered by electrical energy. The drive unit is arranged transversely relative to the longitudinal axis of the vehicle and is drivingly connected to the vehicle wheels R1, R2 of the first axle 101.

In this case no further drive unit is arranged on the second axle 102, i.e. on the front axle of the vehicle 100, whereby costs, weight and fitting space are saved. Alternatively, the drive unit can be arranged on the front axle of the vehicle 100 instead of on the rear axle. To produce an all-wheel drive system, a further drive unit can be arranged on the second axle 102 and can be drivingly connected to the vehicle wheels R3, R4 of that axle 102.

Figure 2:
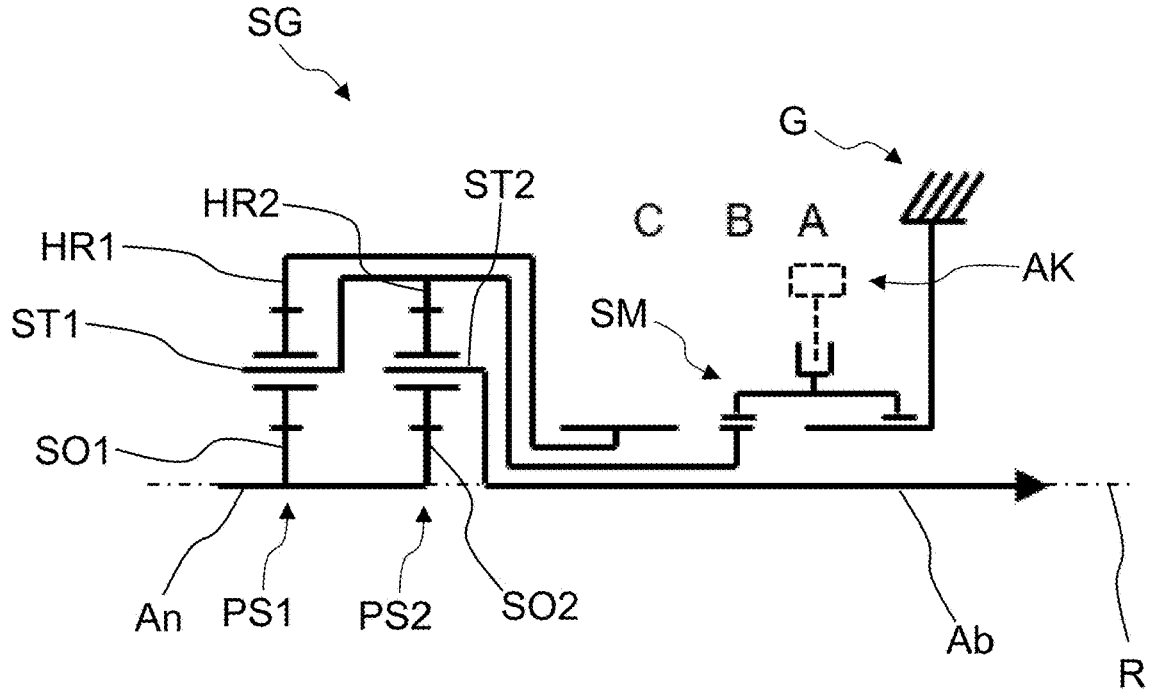
FIG. 2: A very abstract and schematic view of a first embodiment of the transmission according to the invention.
Figure 3:
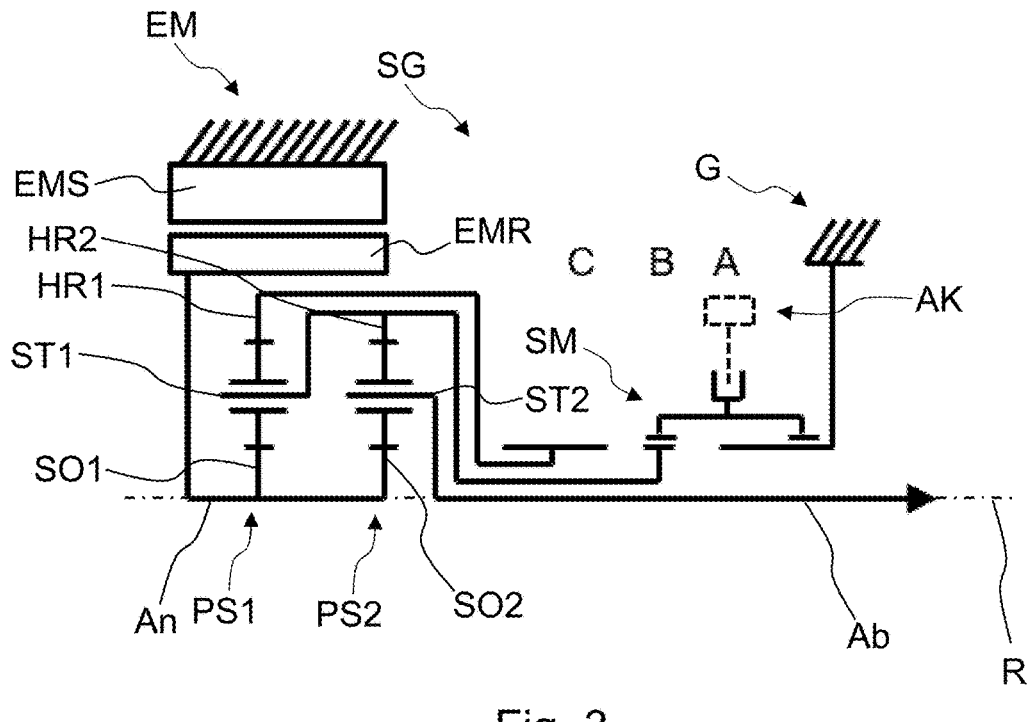
FIG. 3: A very abstract and schematic view of a drive unit according to the invention with a transmission according to FIG. 2.

FIG. 2 shows the transmission SG according to a first embodiment, whereas a drive unit is shown with the transmission SG in FIG. 3. According to FIG. 2 the transmission SG comprises a first shifting element A, a second shifting element B and a third shifting element C. In addition, the transmission SG comprises a first planetary gearset PS1 and a second planetary gearset PS2. The first planetary gearset PS1 comprises three shafts, namely a first sun shaft SO1, a first ring gear shaft HR1 and a first web shaft ST1. The first web shaft ST1 carries a plurality of planetary gearwheels which mesh, i.e. are in tooth engagement, with the first sun shaft SO1 and with the first ring gear shaft HR1. The second planetary gearset PS2 also comprises three shafts, namely a second sun shaft SO2, a second ring gear shaft HR2 and a second web shaft ST2. The second web shaft ST2 carries a plurality of planetary gearwheels which mesh, i.e. are in tooth engagement, with the second sun shaft SO2 and with the second ring gear shaft HR2. Furthermore, the two planetary gearsets PS1, PS2 are arranged axially adjacent to one another, with the shifting elements A, B and C arranged on the drive output side and axially adjacent to the second planetary gearset PS2, particularly in order to save radial fitting space.

The first sun shaft SO1 and the second sun shaft SO2 are connected rotationally fixed to one another and are provided as the drive input. In particular, the first sun shaft SO1 and the second sun shaft SO2 form a first coupling shaft between the two planetary gearsets PS1 and PS2. The first sun shaft SO1 and the second sun shaft SO2, i.e. the first coupling shaft, are connected rotationally fixed to an input shaft An of the transmission SG. By way of the drive input shaft An a drive power of a drive machine can be introduced, at least indirectly or directly. The first web shaft ST1 and the second ring gear shaft HR2 are connected rotationally fixed to one another. In particular the first web shaft ST1 and the second ring gear shaft HR2 form a second coupling shaft between the two planetary gearsets PS1 and PS2. Furthermore, the second web shaft ST2 is connected rotationally fixed to a drive output shaft Ab of the transmission SG. The drive output shaft Ab can be drivingly connected indirectly, for example via a differential, or directly to at least one drive wheel of the vehicle. For example, a drive unit can be provided for each drive wheel of the vehicle.

By means of the first shifting element A the first web shaft ST1 and the second ring gear shaft HR2 connected thereto, i.e., the second coupling shaft, can be connected rotationally fixed to a stationary component in the form of a housing G. By means of the second shifting element B the first ring gear shaft HR1 can be connected rotationally fixed to the stationary component in the form of the housing G. By means of the third shifting element C the planetary gearsets PS1 and PS2 can be blocked, and for that purpose the third shifting element C connects the first ring gear shaft HR1 and the second ring gear shaft HR2, and the first web shaft ST1 connected rotationally fixed thereto, in a rotationally fixed manner.

The transmission has a rotationally symmetrical axis R, which coincides with the drive input shaft An and the drive output shaft Ab. A drive machine and/or a differential can be arranged coaxially or with its axis parallel to the drive input shaft An and the drive output shaft Ab. The embodiments shown in FIG. 2 to FIG. 10 show only the "upper" halves of the respective transmission SG, whereas the "lower" halves (not shown) are symmetrical to the "upper" halves.

The first shifting element A, the second shifting element B and the third shifting element C are combined to form a shifting unit with five shift positions, wherein the shifting unit comprises a single, axially displaceable sliding sleeve SM with which the five shift positions can be realized. The sliding sleeve SM comprises claw-type shifting elements and can be moved axially to the shift position required by means of a single actuator AK. Consequently, all five shift positions of the shifting unit are arranged in line and consist of three gear positions and two neutral positions, with a neutral position arranged in each case between two gear positions. The three gears are engaged one after another or sequentially by moving the sliding sleeve SM in an axial direction through the neutral positions. In that way not only are weight and components saved, but so too are costs, fitting space and assembly effort.

The first gear is engaged when the sliding sleeve SM is in a first gear position, i.e. in a first shift position. In its actuated or closed condition, i.e. in the first shift position of the sliding sleeve SM, the first shifting element A connects the first web shaft ST1 and the second ring gear shaft HR2 to the housing G, in order to engage the first gear. Thus, by actuating the sliding sleeve SM and closing only the first shifting element A, the first gear is engaged. In this case this first shift position of the sliding sleeve SM is shown in FIG. 2.

The first gear is disengaged when the sliding sleeve SM is moved axially to a first neutral position, i.e. to a second shift position. In this second shift position of the sliding sleeve SM the sliding sleeve SM is only in rotating engagement with the housing G, so that the first web shaft ST1 and the second ring gear shaft connected thereto are decoupled from the housing G by the sliding sleeve SM. In the first neutral position the sliding sleeve SM is only in rotating engagement with the housing G, so that the shifting elements A, B and C are in their open condition.

The second gear is engaged by pushing the sliding sleeve SM to a second gear position, i.e. to a third shift position. In its actuated or closed condition, i.e. in the third shift position of the sliding sleeve SM, the second shifting element B connects the first ring gear shaft HR1 to the housing G in order to engage the second gear. Thus, by actuating the sliding sleeve SM and closing only the second shifting element B, the second gear is engaged.

The second gear is disengaged by pushing the sliding sleeve SM to a second neutral position, i.e. to the fourth shift position. In the fourth shift position of the sliding sleeve SM the first ring gear shaft and the housing G are not connected rotationally fixed to one another by the sliding sleeve SM and are thus decoupled from one another. In the second neutral position the sliding sleeve SM is only in rotating engagement with the first ring gear shaft HR1, so that the shifting elements A, B, and C are in their open condition.

The third gear is engaged by pushing the sliding sleeve SM to a third gear position, i.e. to a fifth shift position. In the fifth shift position of the sliding sleeve SM the third shifting element C connects the first ring gear shaft HR1 to the first web shaft ST1 and the second ring gear shaft HR2, in order to engage the third gear. The third gear is designed as a straight-through gear with a gear ratio of 1 and has good efficiency and no tooth losses, since the first and second planetary gearsets PS1 and PS2 are blocked.

FIG. 3 shows the first embodiment of the transmission SG according to the invention from FIG. 2. In this case the transmission SG is connected to an electric machine EM which comprises a stator EMS fixed to the housing and a rotor EMR that can rotate. The electric machine EM is arranged coaxially with the transmission SG. The two planetary gearsets PS1 and PS2 are arranged inside the electric machine, i.e. axially overlapping the electric machine EM, whereby axial fitting space is saved. The transmission SG and the electric machine EM form an electric drive unit with three gears. Apart from that, the transmission SG according to FIG. 3 corresponds to the transmission SG according to FIG. 2, to which reference is made.

Figure 4:
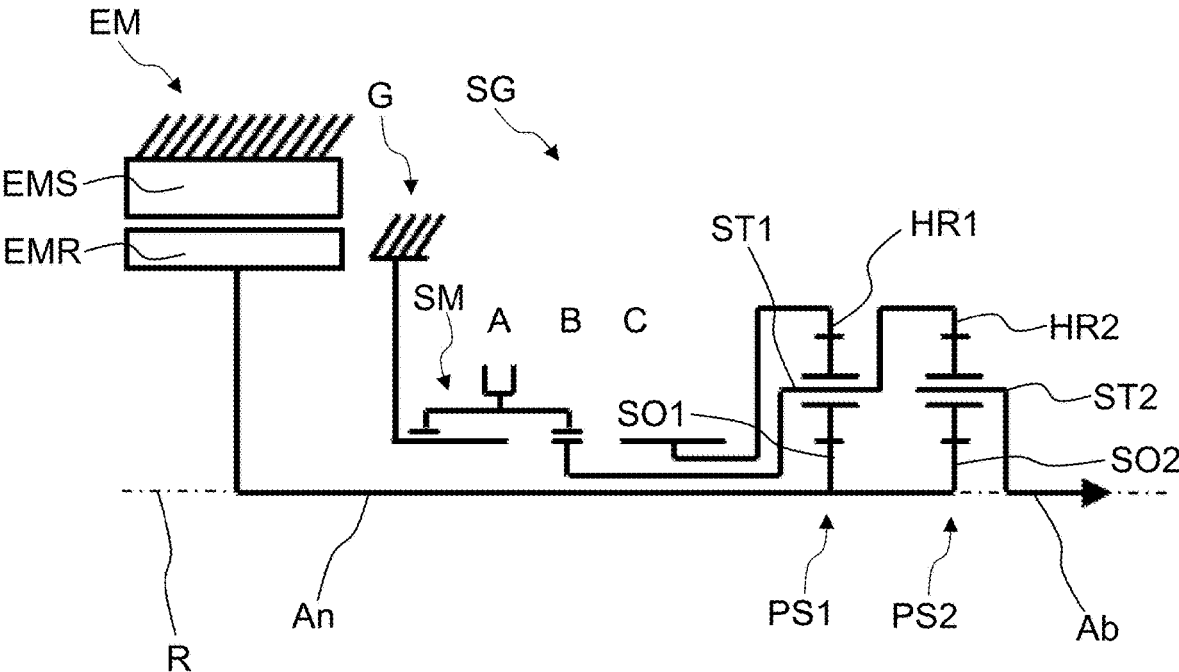
FIG. 4: A very abstract and schematic view of a drive unit according to the invention with a transmission according to a second embodiment.

FIG. 4 shows a second embodiment of the transmission SG according to the invention, which is connected to an electric machine EM by way of the drive input shaft An. The electric drive unit so formed, shown in FIG. 4, corresponds essentially to the electric drive unit according to FIG. 3, the difference between these two embodiments consisting in the arrangement of the shifting unit on the input side. In this case the shifting unit is arranged axially between the electric machine EM and the first planetary gearset PS1. In that way the transmission SG does not need a pot over the second planetary gearset PS2 to connect the first planetary gearset PS1, as is the case in the example embodiment shown in FIG. 3. The actuator for actuating the sliding sleeve SM is no longer shown in this case and in the subsequent example embodiments. In other respects, the example embodiment according to FIG. 4 corresponds to the example embodiment according to FIG. 3, to which reference is made.

Figures 5, 6:
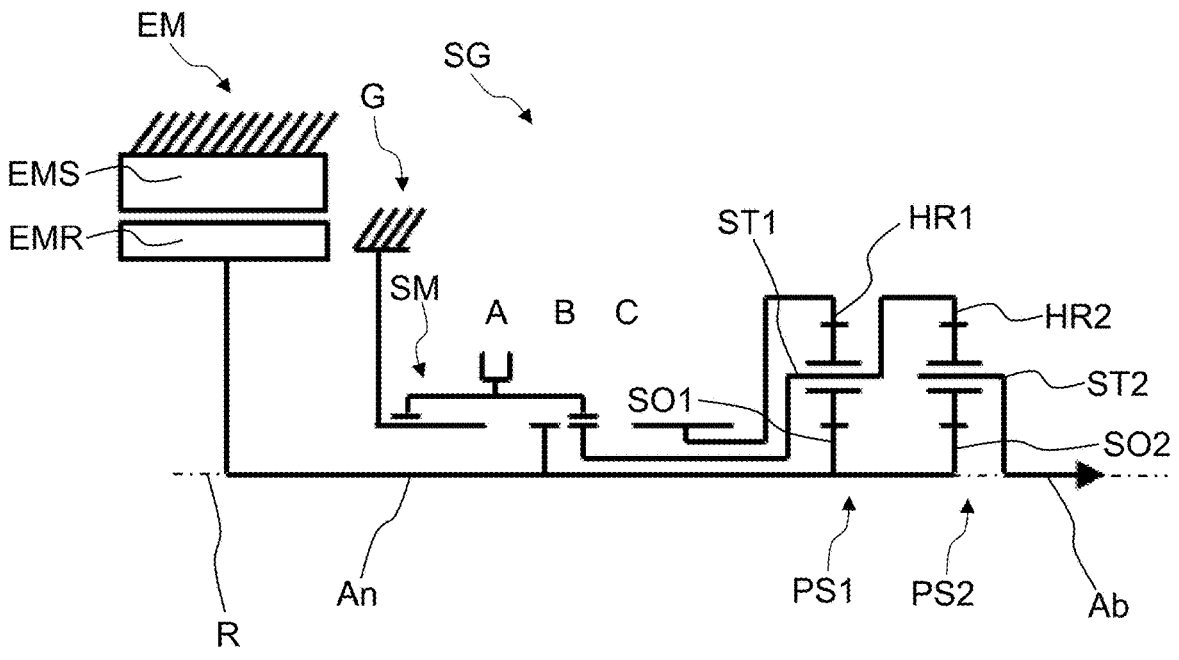
FIG. 5: A very abstract and schematic view of a drive unit according to the invention with a transmission according to a third embodiment.
FIG. 6: A very abstract and schematic view of a drive unit according to the invention with a transmission according to a fourth embodiment.

FIG. 5 shows a third embodiment of a transmission SG according to the invention, which is connected to an electric machine EM by way of the drive input shaft An. The electric drive unit of FIG. 5 so formed corresponds essentially to the electric drive unit of FIG. 4, although in this case a blocking variant is shown. In other words, the third gear is shown otherwise than in FIG. 4. In this case the third shifting element C in its closed state, i.e. in a fifth shift position of the sliding sleeve SM, connects the first ring gear shaft HR1 and the first sun shaft SO1 and the second sun shaft SO2 connected rotationally fixed thereto. The first four shift positions of the sliding sleeve SM correspond exactly to the first four shift positions of the sliding sleeve SM in FIG. 4. In other respects, the example embodiment according to FIG. 5 corresponds to the example embodiment according to FIG. 4, to which reference is made.

FIG. 6 shows a fourth embodiment of the transmission SG according to the invention, which is connected by way of the drive input shaft An to an electric machine EM. The electric drive unit according to FIG. 6 so formed corresponds essentially to the electric drive unit according to FIG. 3, wherein the difference between these two embodiments consists in the arrangement of a differential DG on the axis of symmetry R. The differential DG is in the form of an integral differential with a first planetary gearset 30 and a second planetary gearset 40. The integral differential increases the final transmission ratio and at the same time enables a differential function. Alternatively, the differential DG can also be designed in some other way, for example as a bevel gear differential. Moreover, the differential DG can also be included in the other example embodiments.

Depending on what is required from the integral differential, particularly the transmission ratio to be produced, the two planetary gearsets 30 and 40 of the integral differential can be arranged either axially adjacent to one another or radially one above the other, i.e. radially stacked. In this case, the two planetary gearsets 30, 40 of the integral differential are arranged radially one above the other, whereby axial fitting space is saved. A sun gear 31 of the first planetary gearset 30 of the integral differential forms the differential input shaft D1 of the integral differential and is connected rotationally fixed to the drive output shaft Ab.

The drive output from the integral differential takes place by way of the two differential output shafts D2 and D3, wherein a web shaft 33 of the first planetary gearset 30 is connected rotationally fixed to the first differential output shaft D2 whereas a ring gear 42 of the second planetary gearset 40 of the integral differential is connected rotationally fixed to the second differential output shaft D3. The sun gear 41 of the second planetary gearset 40 of the integral differential is formed rotationally fixed with the ring gear 32 of the first planetary gearset 30 of the integral differential and in the present case is in the form of an integral piece as an intermediate wheel with inner teeth and outer teeth. The web shaft 43 of the second planetary gearset 40 of the integral differential carries a plurality of planetary gearwheels, which mesh with the sun gear 41 and the ring gear 42, and is connected rotationally fixed to a stationary component in the form of the housing G. In addition, the web shaft 33 of the first planetary gearset 30 of the integral differential carries a plurality of planetary gearwheels, which mesh with the sun gear 31 and the ring gear 32.

By means of the first planetary gearset 30 of the integral differential, a first drive output torque can be transmitted to the first differential output shaft D2. A supporting torque of the first planetary gearset 30 that acts in opposition to the first drive output torque is transmitted to the second planetary gearset 40 and can be transformed in the second planetary gearset 40 in such manner that a second drive output torque corresponding to the first drive output torque can be transmitted to the second differential output shaft D3. In other words, by way of the integral differential a drive input power fed in via the sun gear 31 of the first planetary gearset 30 is divided between the two differential output shafts D2 and D3. In this case the first differential output shaft D2 extends through the transmission SG and the electric machine EM. The shifting unit with the two shifting elements A and B is arranged particularly compactly, axially between the two planetary gearsets PS1, PS2 and the differential DG. In other respects, the example according to FIG. 6 corresponds to the example embodiment according to FIG. 3, to which reference is made.

Figure 7:
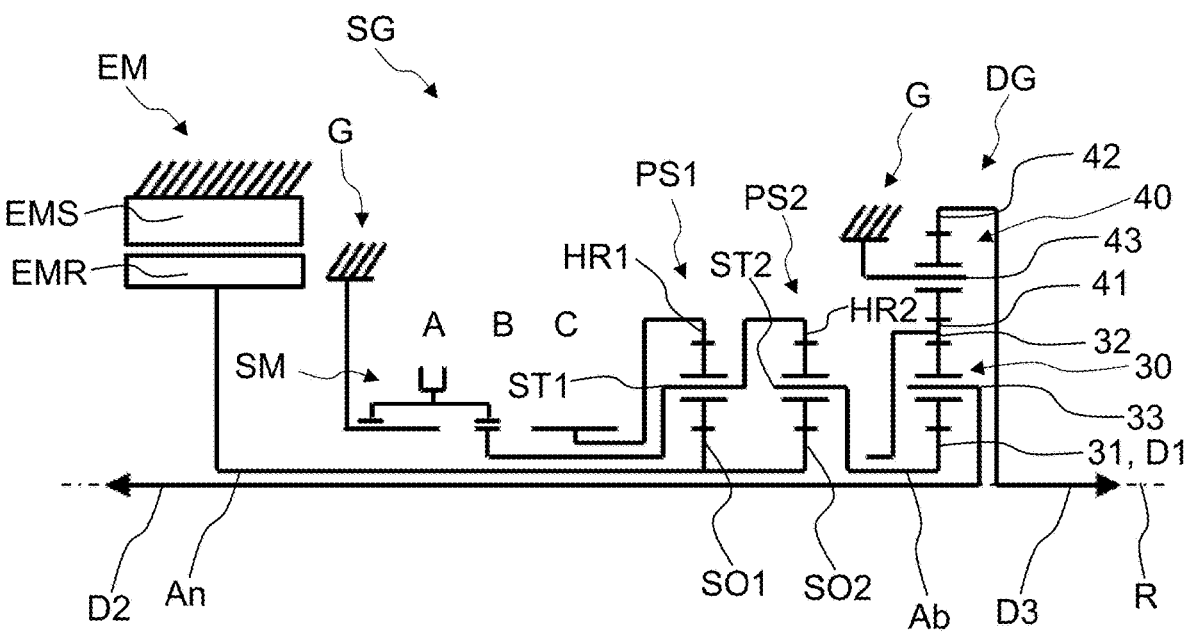
FIG. 7: A very abstract and schematic view of a drive unit according to the invention with a transmission according to a fifth embodiment.

FIG. 7 shows a fifth embodiment of the transmission SG according to the invention, which is connected to an electric machine EM by way of the drive input shaft An. The electric drive unit according to FIG. 7 formed in that way corresponds essentially to the electric drive unit according to FIG. 4, the difference between these two embodiments consisting in the arrangement of the differential DG on the axis of symmetry R. The differential DG is in the form of an integral differential with a first planetary gearset 30 and a second planetary gearset 40, and corresponds exactly to the integral differential according to FIG. 6, to which reference is made. In other respects, the example embodiment according to FIG. 7 corresponds to the example embodiment according to FIG. 4, to which reference is made.

Figure 8:
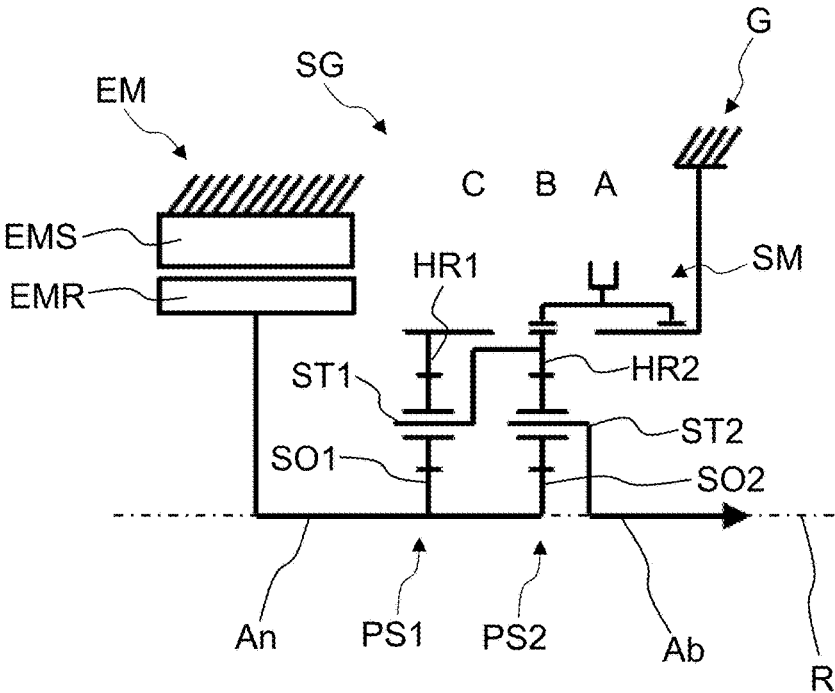
FIG. 8: A very abstract and schematic view of a drive unit according to the invention with a transmission according to a sixth embodiment.

FIG. 8 shows a sixth embodiment of the transmission SG according to the invention, which is connected by way of the drive input shaft An to an electric machine EM. The electric drive unit according to FIG. 8 formed in that way corresponds essentially to the electric drive unit according to FIG. 4, the difference between these two embodiments consists in that the shifting unit with the three shifting elements A, B and C is arranged on a larger diameter and the two planetary gearsets PS1, PS2 are nested inside the shifting unit. By virtue of this arrangement axial fitting space in particular is saved. In other respects, the example embodiment according to FIG. 8 corresponds to the example embodiment according to FIG. 4, to which reference is made.

Figure 9:
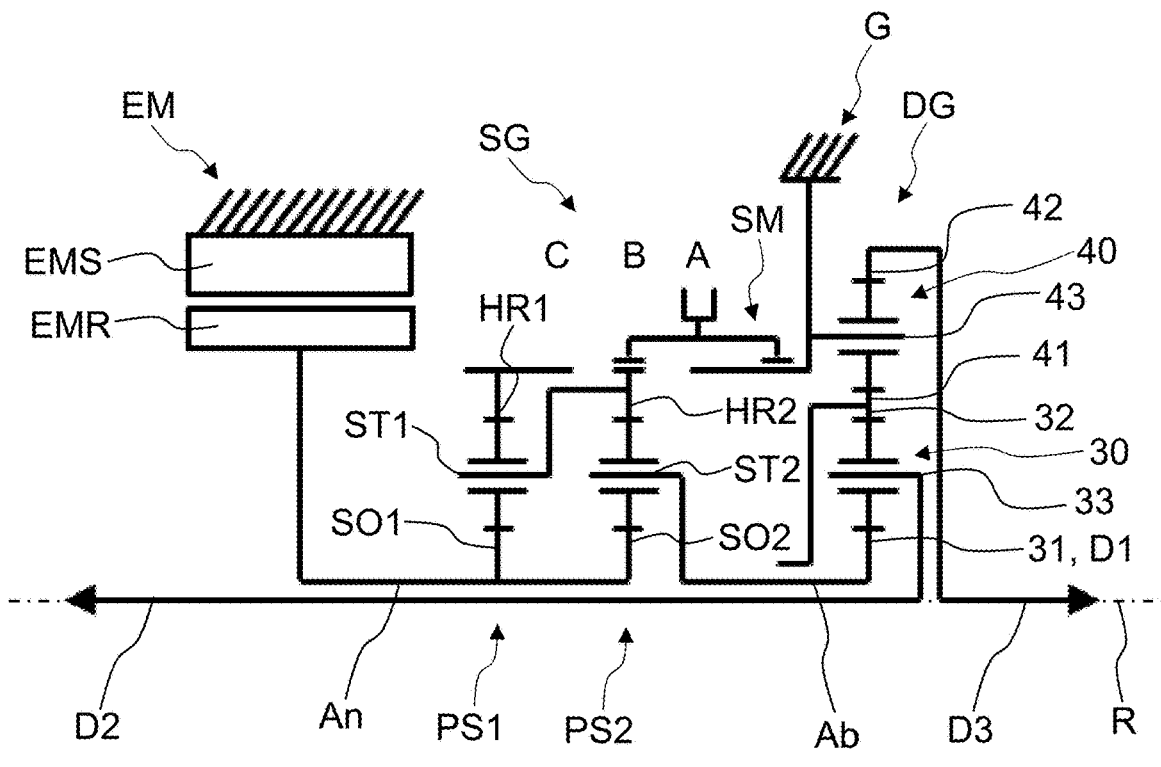
FIG. 9: A very abstract and schematic view of a drive unit according to the invention with a transmission according to a seventh embodiment.

FIG. 9 shows a seventh embodiment of the transmission SG according to the invention, which is connected by way of the drive input shaft An to an electric machine EM. The electric drive unit according to FIG. 9 formed in that way corresponds essentially to the electric drive unit according to FIG. 8, the difference between these two embodiments consisting in the arrangement of a differential DG on the axis of symmetry R. The differential DG is in the form of an integral differential with a first planetary gearset 30 and a second planetary gearset 40, and it corresponds exactly to the integral differential according to FIG. 6, to which reference is made.

Figure 10:
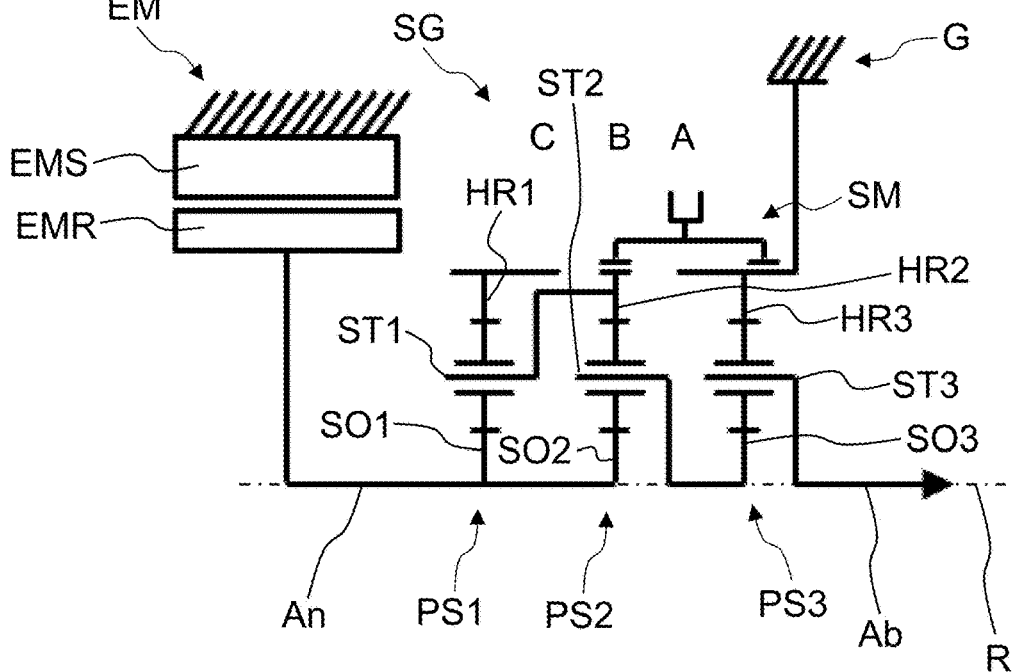
FIG. 10: A very abstract and schematic view of a drive unit according to the invention with a transmission according to an eighth embodiment.

FIG. 10 shows an eighth embodiment of the transmission SG, which is connected by way of the drive input shaft An to an electric machine EM. The electric drive unit according to FIG. 10 formed in that way corresponds essentially to the electric drive unit according to FIG. 8, the difference between these two embodiments consisting in the arrangement of a downstream gear transmission PS3. The gear transmission PS3 comprises a third sun shaft SO3, a third ring gear shaft HR3, and a third web shaft ST3, wherein the third sun shaft SO3 is connected rotationally fixed to the second web shaft ST2, wherein the third ring gear shaft HR3 is connected rotationally fixed to a stationary component in the form of a housing G, and wherein the third web shaft ST3 is designed to be the drive output and is connected rotationally fixed to the drive output shaft Ab. In other words, the downstream gear transmission PS3 is provided as a constant gear ratio transmission and is arranged in the power flow between the second planetary gearset PS2 and the drive output shaft Ab. The drive output shaft Ab is preferably connected to a differential (not shown). The two planetary gearsets PS1, PS2 and the gear transmission PS3 are nested radially inside the shifting unit. In that way axial fitting space in particular is saved. In other respects, the example embodiment according to FIG. 10 corresponds to the example embodiment according to FIG. 8, to which reference is made.

Figure 11:
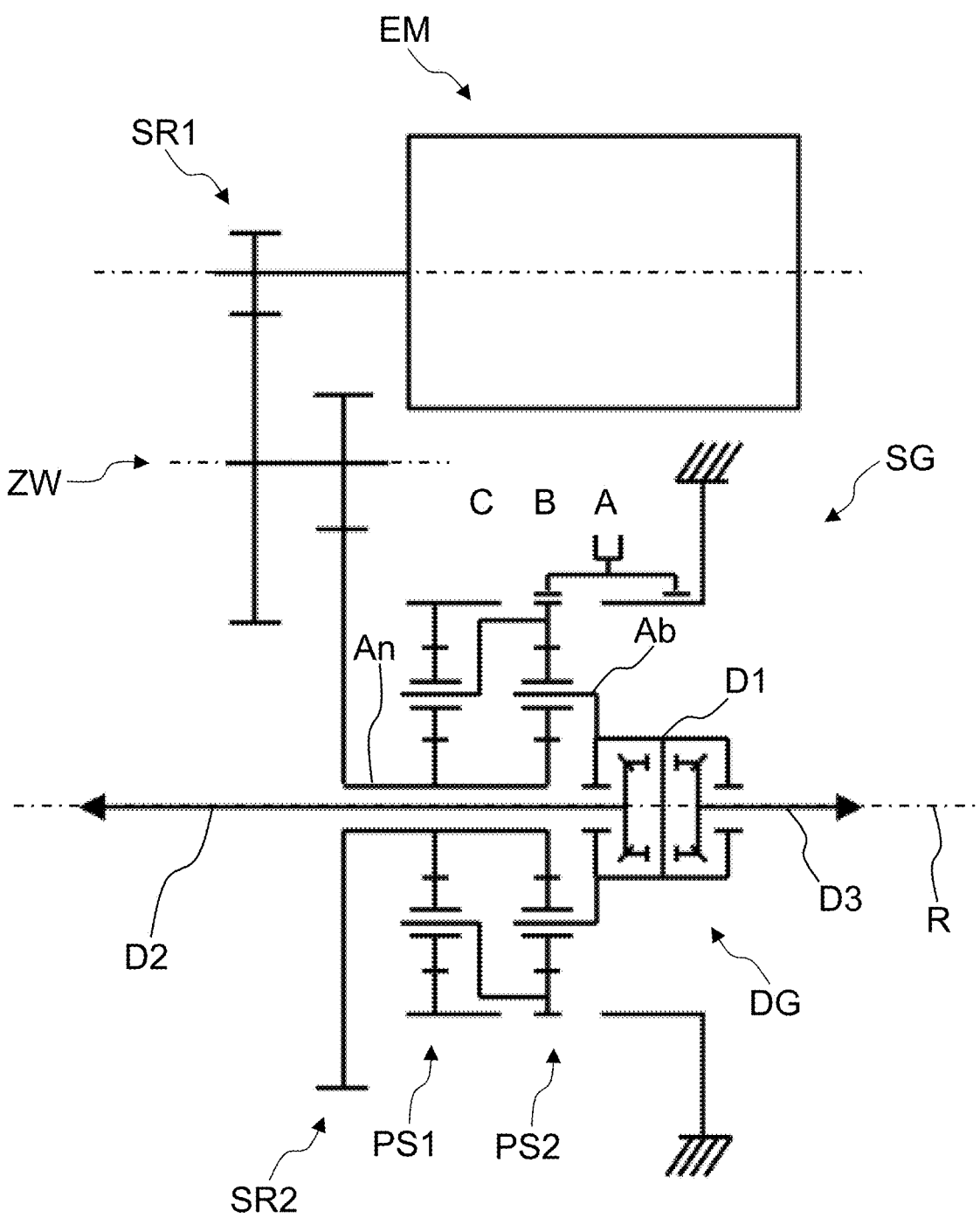
FIG. 11: A very abstract and schematic view of a drive unit according to the invention with a transmission according to a ninth embodiment.

FIG. 11 shows a ninth embodiment of the transmission SG according to the invention, which is connected by way of the drive input shaft An to and electric machine EM. The electric drive unit according to FIG. 11 is formed in that way corresponds essentially to the electric drive unit according to FIG. 8, the difference between these two embodiments consisting in the arrangement of a differential DG on the axis of symmetry R. The differential DG is in the form of a bevel gear differential with a differential input shaft D1 and two differential output shafts D2 and D3. The differential DG has two drive output elements on the wheel side, in particular a first drive output gearwheel which is connected rotationally fixed to the first differential output shaft D2 and a second drive output gearwheel which is connected rotationally fixed to the second differential output shaft D3. The two drive output gearwheels each mesh with an equalization element. The equalization elements are mounted to rotate about their own axes in the differential cage which forms the differential input shaft D1. Each drive output gearwheel is connected rotationally fixed to a corresponding differential output shaft D2 or D3. The drive input to the differential DG takes place via the differential cage, which is connected rotationally fixed to the drive output shaft Ab. The drive power fed into the differential DG is distributed between the differential output shafts D2, D3 and transmitted to the drive wheels of the axle. The differential output shafts D2, D3 are designed to be connected to the drive wheels of the vehicle. The respective differential output shafts can be connected to the associated vehicle wheel directly or indirectly by way of a joint, a joint shaft and/or a wheel hub. In this case the first differential output shaft D2 extends axially through the two planetary gearsets PS1, PS2.

Furthermore, the electric machine EM is arranged with its axis parallel to the axis of symmetry R and connected to the drive input shaft An via two spur gear stages SR1 and SR2. The two spur gear stages SR1 and SR2 are provided in order to form a preliminary transmission ratio. The first spur gear stage SR1 comprises a first gearwheel which is connected rotationally fixed to a rotor of the electric machine EM and a second gearwheel which is connected rotationally fixed to an intermediate shaft ZW. The two gearwheels of the first spur gear stage SR1 mesh with one another. The second spur gear stage SR2 comprises a first gearwheel which is connected rotationally fixed to the intermediate shaft and a second gearwheel which is connected rotationally fixed to the drive input shaft An. The two gearwheels of the second spur gear stage SR2 mesh with one another. By virtue of the two spur gear stages SR1 and SR2, not only is an additional gear ratio produced for the electric machine EM, but also an axial separation between the transmission SG and the electric machine EM can be adjusted according to need. The connection of the electric machine EM via the two spur gear stages SR1, SR2 can also be provided in the other example embodiments so that the electric machine EM is arranged with its axis parallel to the transmission SG. In other respects, the example embodiment according to FIG. 11 corresponds to the example embodiment according to FIG. 8, to which reference is made.

Figure 12:
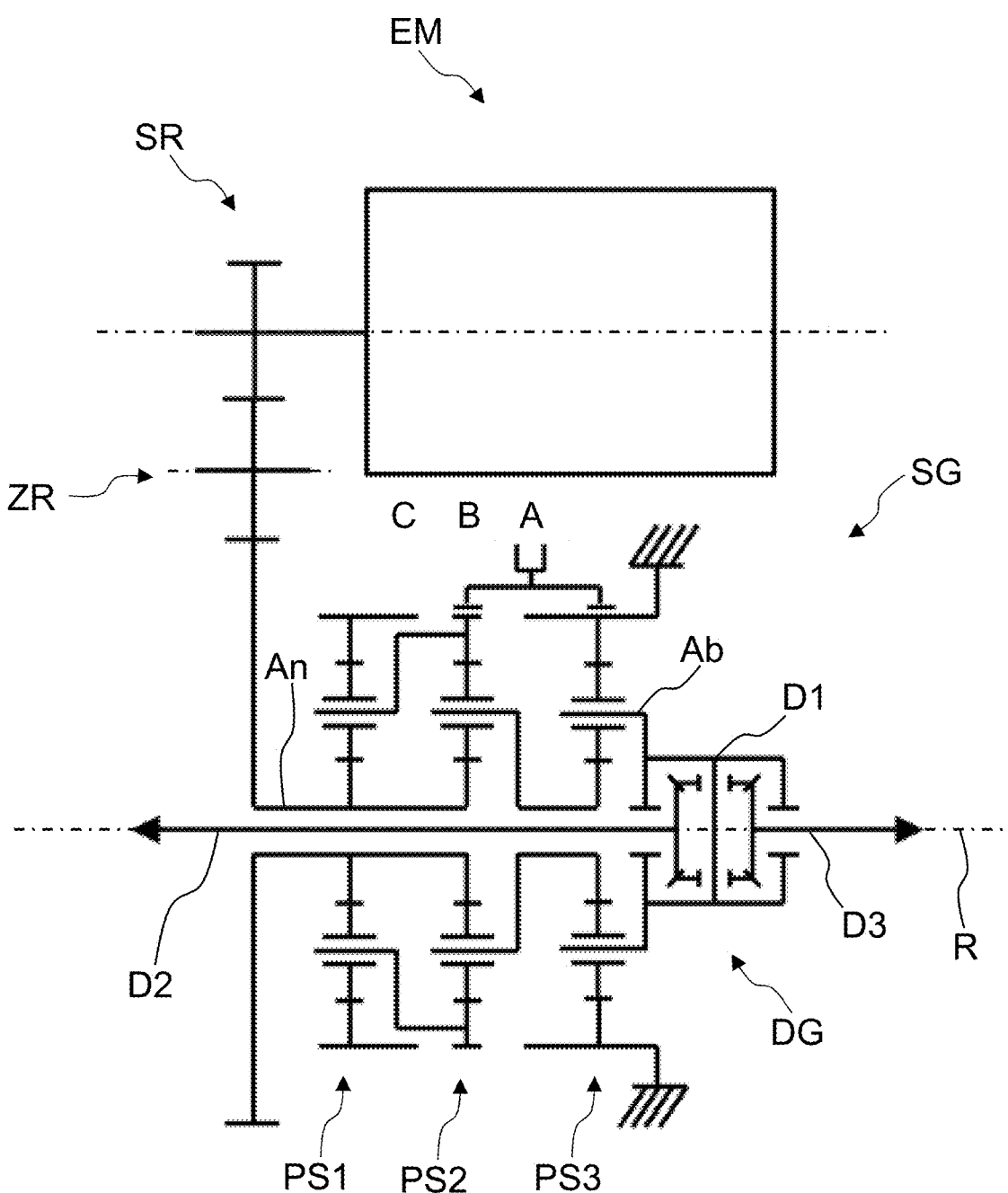
FIG. 12: A very abstract and schematic view of a drive unit according to the invention with a transmission according to a tenth embodiment.

FIG. 12 shows a tenth embodiment of the transmission SG according to the invention, which is connected by way of the drive input shaft AN to an electric machine EM. The electric drive unit formed according to FIG. 12 corresponds essentially to the electric drive unit according to FIG. 10, the difference between these two embodiments consisting in the arrangement of a differential DG on the axis of symmetry R. The differential DG is a bevel gear differential with a differential input shaft D1 and two differentia output shafts D2, D3. The differential DG has two drive output elements on the wheel side, specifically a first drive output gearwheel which is connected rotationally fixed to the first differential output shaft D2 and a second drive output gearwheel which is connected rotationally fixed to the second differential output shaft D3. The two drive output gearwheels mesh in each case with a respective equalizing element. The equalizing elements are mounted to rotate about their own axes in the differential cage, which is designed to be the differential input shaft D1. Each drive output gearwheel is connected rotationally fixed to its respective differential output shaft D2 or D3. The drive input to the differential DG takes place via the differential cage, which is connected rotationally fixed to the drive output shaft Ab. The drive power fed into the differential DG is distributed to the two differential output shafts D2, D3 and transmitted to the drive wheels of the axle. The differential output shafts D2, D3 are designed to be drivingly connected to the drive wheels of the vehicle. The respective differential output shafts D2, D3 can be connected to their associated vehicle wheels directly, or indirectly via a joint, a joint shaft and/or a wheel hub. The first differential output shaft D2 extends in this case through the three planetary gearsets PS1, PS2 and PS3.

Moreover, the electric machine EM is arranged with its axis parallel to the axis of symmetry R and is connected to the drive input shaft An by way of a spur gear stage SR. The spur gear stage is provided in order to form a preliminary transmission ratio, and comprises a first gearwheel connected rotationally fixed to a rotor shaft of the electric machine EM, a second gearwheel connected rotationally fixed to the drive input shaft An, and an intermediate gearwheel ZR which is arranged with its axis parallel to the electric machine EM and to the axis of symmetry R, and which meshes with the first and second gearwheels. By virtue of the spur gear stage, not only is an additional transmission ratio for the electric machine EM produced, but also an axial separation between the transmission SG and the electric machine EM is adjusted according to need. The connection of the electric machine EM by way of the spur gear stage SR can also be provided in the other example embodiments, so that the electric machine EM is arranged with its axis parallel to the transmission SG. In other respects, the example embodiment according to FIG. 12 corresponds to the example embodiment according to FIG. 10, to which reference is made.

Figure 13:
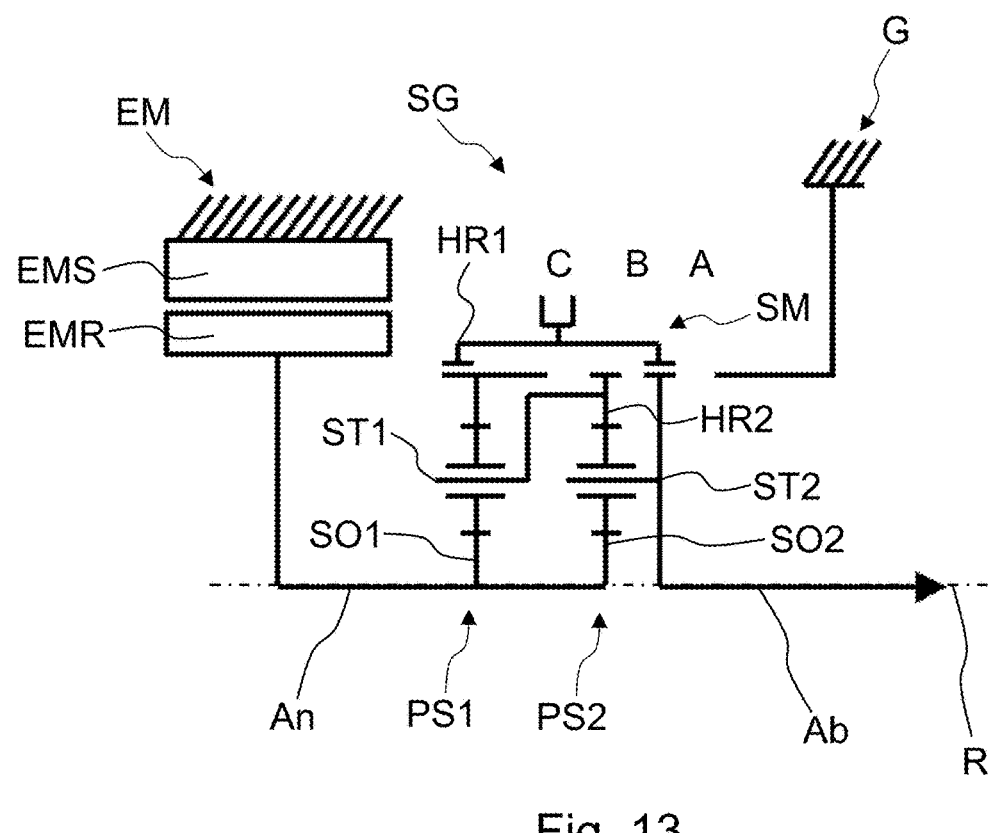
FIG. 13: A very abstract and schematic view of a drive unit according to the invention with a transmission according to an eleventh embodiment.

FIG. 13 shows an eleventh embodiment of a transmission SG according to the invention, which is connected to an electric machine EM by way of the drive input shaft An. The electric drive unit formed in that way as shown in FIG. 13 corresponds essentially to the electric drive unit according to FIG. 8, although in this case a blocking variant is shown. In other words, the third gear is represented otherwise than in FIG. 8. In the present case, in its closed condition, i.e. in the fifth shift position of the sliding sleeve SM, the third shifting element C connects the first ring gear shaft HR1 and the second web shaft ST2 as well as the drive output shaft Ab connected rotationally fixed thereto. The two planetary gearsets PS1, PS2 rotate as a block. The first four shift positions of the sliding sleeve SM correspond exactly to the first four shift positions of the sliding sleeve in FIG. 8. In this case, the fifth position of the sliding sleeve SM is shown. In other respects, the example embodiment according to FIG. 13 corresponds to the example embodiment according to FIG. 8, to which reference is made.

Figure 14:
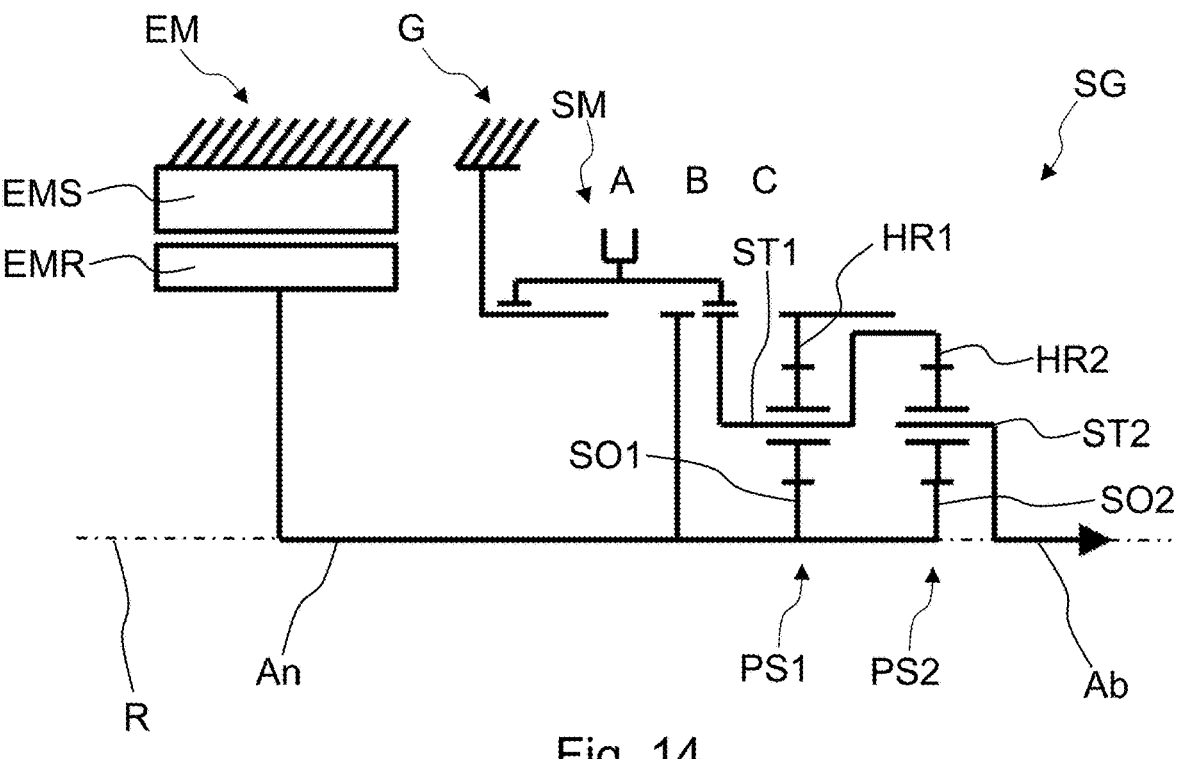
FIG. 14: A very abstract and schematic view of a drive unit according to the invention with a transmission according to a twelfth embodiment.

FIG. 14 shows a twelfth embodiment of a transmission SG according to the invention, which is connected to an electric machine EM by way of the drive input shaft An. The electric drive unit formed in that way as shown in FIG. 14 corresponds essentially to the electric drive unit according to FIG. 5, but in this case the shifting elements A, B and C are arranged on a larger diameter and the first planetary gearset PS1 is arranged radially nested therein. In that way the transmission SG is made more compact. The first planetary gearset is arranged at least partially radially inside the shifting unit. For that purpose, the first planetary gearset projects at least partially axially into the shifting unit and is made at least partially overlapping with the shifting unit. In other respects, the example embodiment according to FIG. 14 corresponds to the example embodiment according to FIG. 5, to which reference is made.

INDEXES

100 Vehicle
101 First axle
102 Second axle
R1 Vehicle wheel
R2 Vehicle wheel
R3 Vehicle wheel
R4 Vehicle wheel
An Drive input shaft
Ab Drive output shaft
SG Transmission
EM Electric machine
EMS Stator of the electric machine
EMR Rotor of the electric machine

14

SR Spur gear stage
SR1 First spur gear stage
SR2 Second spur gear stage
ZW Intermediate shaft
ZR Intermediate gearwheel
PS1 First planetary gearset
SO1 First sun gear
HR1 First ring gear shaft
ST1 First web shaft
PS2 Second planetary gearset
SO2 Second sun gear
HR2 Second ring gear shaft
ST2 Second web shaft
PS3 Gear transmission
SO3 Third sun gear
HR3 Third ring gear shaft
ST3 Third web shaft
AK Actuator
G Housing
R Axis of symmetry
DG Differential
D1 Differential input shaft
D2 First differential output shaft
D3 Second differential output shaft
30 First planetary gearset
31 Sun gear of the first planetary gearset
32 Ring gear of the first planetary gearset
33 Web shaft of the first planetary gearset
40 Second planetary gearset
41 Sun gear of the second planetary gearset
42 Ring gear of the second planetary gearset
43 Web shaft of the second planetary gearset
SM Sliding sleeve
A First shifting element
B Second sex
C Third shifting element

The invention claimed is:

1. A transmission for a vehicle, comprising:
a first shifting element;
a second shifting element;
a third shifting element;
a first planetary gearset with a first sun shaft, a first ring gear shaft, and a first web shaft; and
a second planetary gearset with a second sun shaft, a second ring gear shaft, and a second web shaft;
wherein the first sun shaft is connected rotationally fixed to the second sun shaft and are designed as a drive input;
wherein the first web shaft is connected rotationally fixed to the second ring gear shaft;
wherein the second web shaft is designed as the drive output;
wherein the first shifting element, the second shifting element, and the third shifting element are combined to form a shifting unit with five shift positions, wherein the shifting unit comprises a single axially displaceable sliding sleeve;
wherein in the closed condition of the first shifting element, a first gear with a first gear ratio is engaged, wherein in the first gear the first web shaft and the second ring gear shaft are connected rotationally fixed to a stationary component;
wherein in the closed condition of the second shifting element, a second gear with a second gear ratio is engaged, wherein in the second gear the first ring gear shaft is connected rotationally fixed to a stationary component; and wherein in the closed condition of the third shifting element, a third gear designed as a straight-through with a third gear ratio is engaged, wherein in the third gear the planetary gearsets are blocked; and wherein in its closed condition the third shifting element connects the first ring gear shaft and the second ring gear shaft rotationally fixed to one another.

2. The transmission according to claim 1, wherein the shifting unit comprises a neutral position between two gear positions.

3. The transmission according to claim 1, wherein all the shifting elements are in the form of interlocking shifting elements.

4. The transmission according to claim 1, further comprising a differential with a differential input shaft and two differential output shafts.

5. The transmission according to claim 4, wherein the differential is in the form of an integral differential with two radially nested planetary gearsets.

6. The transmission according to claim 1, further comprising a gear transmission with a third sun shaft, a third ring gear shaft, and a third web shaft, wherein the third sun shaft is connected rotationally fixed to the second web shaft, wherein the third ring gear shaft is connected rotationally fixed to a stationary component, and wherein the third web shaft is configured as the drive output.

7. The transmission according to claim 1, wherein the shifting unit is arranged radially nested with at least one of the two planetary gearsets.

8. The transmission according to claim 1, wherein the shifting unit is configured to be arranged axially between an electric machine and the first planetary gearset.

9. A drive unit for a vehicle, comprising an electric machine and a transmission according to claim 1.

10. A vehicle comprising at least one drive unit having an electric machine and a transmission according to claim 1.

* * * * *